United States Patent Office 3,573,953
Patented Apr. 6, 1971

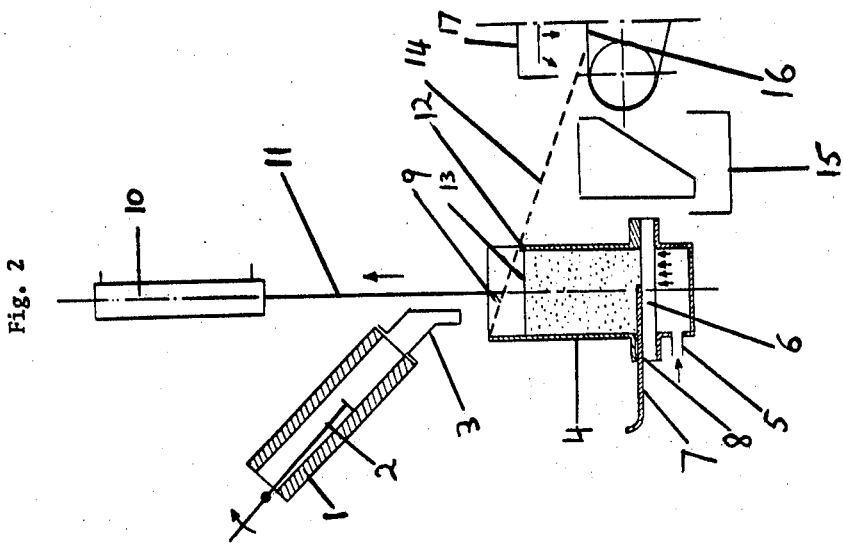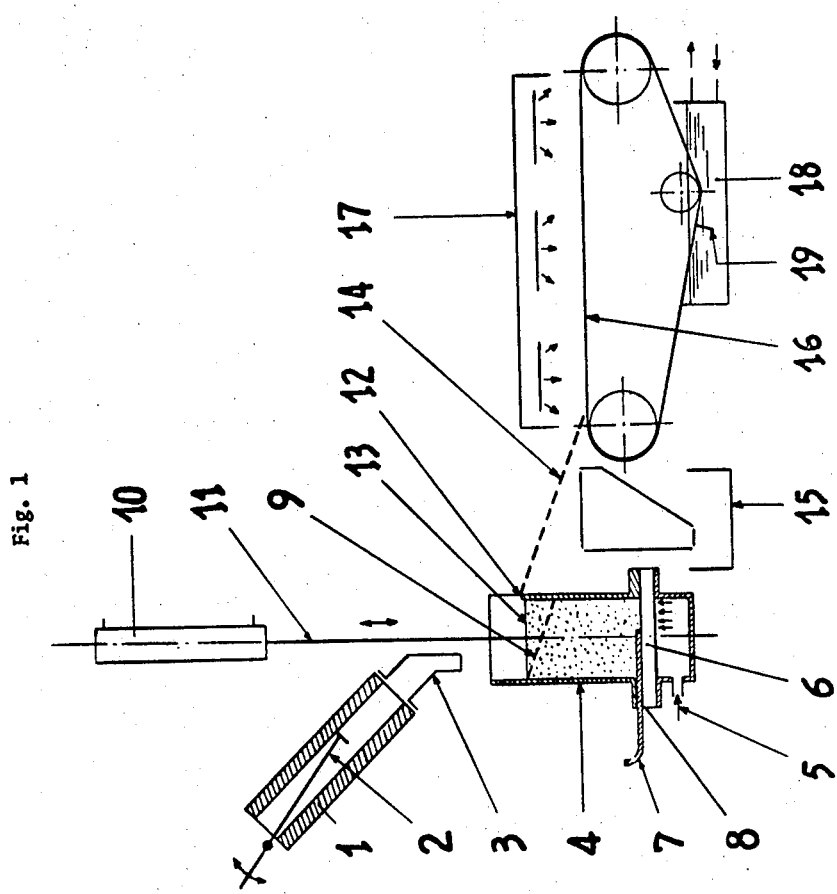

3,573,953
PROCESS AND APPARATUS FOR COATING
SMALL OBJECTS
Jean Michel Laulan, Lyon, France, assignor to
Rhone-Poulenc S.A.
Filed Sept. 8, 1966, Ser. No. 577,960
Claims priority, application France, Sept. 15, 1965,
31,541
Int. Cl. B44d 1/095
U.S. Cl. 117—21                                    10 Claims

ABSTRACT OF THE DISCLOSURE

Heated articles are passed into a bed of fluidized plastic material having a dense zone and a less dense zone. The articles contact an upper more dense zone first and a lower less dense zone thereafter, wherein they are coated with the plastic material.

This invention relates to a process and an apparatus for coating small objects with plastic substances and more specifically to a process and an apparatus to be used in connection with plastic substances present in a fluidized mass, that is as a bed of finely divided solid particles lifted and agitated by a rising stream of a gas.

The fluidized solid method offers the advantage that it is suitable for continuous operation. Several processes have been described for coating articles, utilizing a fluidized solid. The main requirements are that the articles or objects must be capable of withstanding the temperature of the treatment and must be made of a substance of sufficient conductivity, for instance, a metal, or glass, or ceramic.

Essentially these coating processes consist of dipping the object to be coated in a fluidized bed of the powdered plastic substance. More specifically, the object to be coated is heated to a temperature higher than the temperature of agglomeration of the particles of the coating material, and it is then immersed into the bed of the fluidized powder for a period of time which varies according to the desired thickness of the coating. The object is then removed from the bath and allowed to cool. An improvement of this procedure consists of rotating the article in the fluidized bed of the plastic material, during the coating operation.

All these processes have in common the feature that the object to be coated must be kept suspended for a certain period of time in the fluidized bed by means of a tool, such as tongs or hooks. The use of the tools of any kind, leaves either a spot on the object, where coating has not taken place, or leaves areas in which the coating shows marks, because of the tools employed to grasp and to hold the object in the fluidized bed.

The defects in the coating mentioned above, are not too serious in the case of objects of relatively large dimensions, for obvious reasons. However, in the case of objects of small dimensions, such as, for instance, rings, hooks, pins, metallic buttons and knobs, if the fluidized bed technique is applied, the use of the tools for holding the object causes faults in the coating, which become more serious, the smaller the dimensions of the object. It is manifest that the use of tools for grasping and holding objects of small dimensions in the fluidized bed, constitutes a drawback in the continuous coating of the objects and substantially diminishes the value of the finished goods and the productivity of the process.

An object of this invention is to provide a process for coating small objects with a fluidized bed of a plastic substance which may be conducted rapidly, efficiently, and continuously, and which completely eliminates the need of tools for grasping and holding the object in the bed of the fluidized substance.

Another object of this invention is to provide an apparatus for coating small objects with a fluidized bed of plastic substances, which completely eliminates the need of tools for grasping and holding the objects. Still another object is to provide an apparatus for coating small objects with a plastic substance in the form of a fluidized powder, which is suitable for continuous operation and which may be easily and economically assembled.

According to one aspect of the invention there is provided an apparatus for coating heated articles comprising a vessel, means for supplying gas to said vessel so that at least a portion of a powder contained therein is fluidized and at least two substantially vertically adjacent powder containing zones of different density are produced within said vessel, means for supplying heated articles to be coated to the upper part of the vessel in the more dense zone, a grid which is inclined to the horizontal being vertically reciprocable in the vessel, the higher part of the grid, in its lowermost position, being in the more dense zone, and means removing articles to be coated from the less dense zone.

The objects to be coated are first heated in an oven, to a predetermined temperature, and are then introduced into the fluidizing vessel at a controlled rate. For this purpose a stopping device is inserted along the path between the oven and the fluidizing vessel. The stopping device is so controlled that it allows an object to fall into the fluidizing vessel, when the grid is in the lower position, and prevents the object from dropping, when the grid is in the upper position.

The use of this apparatus allows the preheated object to be coated to be brought in contact first with the part of the bath which is the least fluidized, under the force of gravity. More specifically, the object to be coated falls gently into the upper part of the bath, and does not come in contact with the grid until the lower surface of the object has had a chance to become coated. In this manner, coating of the object, including the lower surface, takes place without the neceessity of using tools.

In a subsequent stage, the object comes in contact with the upper end of the inclined grid, and slides along the length of the grid, under the force of gravity, in the zone in which the plastic material is the most fluidized. In this zone the coating is achieved during the stage in which the grid is in the lower position. In a subsequent stage, the grid is raised, and the object is ejected from the bath under the action of the force of gravity, as it will be described more in detail below. The ejectment may be facilitated by any of the conventional devices.

For the purpose of obtaining two zones of different density of the fluidized material, several devices may be used. It is possible to use a vessel with the bottom made of a porous plate, which has superimposed a shutter of adjustable dimensions. It is also possible to use a plate, of which only one part is porous. Another device consists of the use of a vessel for the bath, one wall of which is sufficiently inclined, so that an appreciable portion of the surface of the bath is not vertically above the porous plate, and escapes fluidization. According to one specific embodiment of the invention, the degree of inclination of the wall of the vessel, may be adjusted. With this device, there is obtained a zone which is not fluidized, adjacent to a zone which is normally fluidized.

According to another embodiment of the invention, it is possible to substitute for the zone which is not fluidized, a zone of intermediate density, the latter being fed at the bottom by a fluidizing gas under a pressure lower than the gas which feeds the more fluidized zone. It is also possible, according to another embodiment of the invention, to maintain the bath in more than two zones of different density, with the zone of intermediate density in addition to the zone which is not fluidized. Instead of using a fluidizing gas with a lower pressure, it is also possible to use a less porous plate in one part of the bath, so that a lesser amount of fluidizing gas goes through.

The movable grid may consist of a metallic plate perforated with holes of a size depending on the dimensions of the object to be coated, or may be made of metallic screen of suitable mesh size. The inclination of the grid in the horizontal direction is similarly regulated in proportion to the dimensions of the object to be coated, because when the grid is in the higher position, the automatic ejection of the object, under the action of either the force of gravity alone, or the force of gravity combined with an additional device, for instance a vibrator, takes place. It is, of course, necessary that the grid be capable of moving vertically in the fluidized bed of the powder of the plastic material, without substantial entrapment of the latter. The motion of the grid up and down may be achieved by any suitable device, for instance by a pneumatic jack. The device which makes possible the vertical motion of the grid is advantageously connected, by means of an automatic regulatory system, to the device which controls the delivery of the objects after they have been heated. In this manner the same pneumatic jack which controls the motion of the grid, may also control the opening of the stopping device which is fixed on the device which delivers the objects into the fluidizing vessel in accordance with the position of the grid.

The invention will now be illustrated further by reference to the accompanying drawings which illustrate one embodiment of the novel apparatus in accordance with this invention. FIG. 1 represents a schematic view of one apparatus used for the coating, FIG. 2 represents the position taken by the grid at the time of the ejection of the object. In FIG. 1, the numeral 1 stands for an electric oven, which is provided with a stopping device 2, which may be adjusted as to regulate the delivery of the preheated objects at a desired rate. The oven 1 is also provided with a guide 3 which directs the fall of the object to be coated into the appropriate zone of the fluidizing vessel, shown at 4. In this embodiment of the invention, the fluidizing vessel is of parallelepipedal shape and includes a gas inlet shown at 5, a porous bottom, shown at 6, which allows the passage of the fluidizing gas, a movable shutter 7, which slides in the track 8 and which passes through the wall of the vessel 4 when gas is fed under pressure into the vessel through inlet 5, at least a part of the powder in the vessel is fluidized and two substantially vertical adjacent zones are formed. The zone on the left, as seen in the figures, above the shutter 7 is not fluidized or is only partly fluidized and is therefore more dense than the zone on the right.

The inclined grid 9 is connected with a pneumatic jack 10, which imparts to it a controllable vertical reciprocating motion, between an uppermost and a lowermost position. In the lowermost position the higher part of the grid is in the more dense zone and the lower part in the less dense zone. The rod 11 is integrally connected with the grid 9, by suitable means, for instance by a clamp or a strap. According to this embodiment, the grid 9 is made of a metallic square mesh of 3 mm. opening, with wire of 0.5 mm. diameter.

The numeral 13 represents the level of the coating powder, and the numeral 12 represents an opening in the wall of the vessel, above the level 13, for the ejection of the coated objects.

The fluidizing vessel 4 is followed by a track 14, with perforated bottom, which lets any excess powder, which may be carried along by the coated objects, fall in a recovery vessel 15. The coated object travels on the track 14 and reaches a conveyor band 16 which is made of non-adherent and heat-resistant material. For this purpose, it is advantageous to coat the band with silicone or with fluorinated resins. The band 14 goes through an infrared heating zone, shown at 17, where the surface of the coating is smoothed out.

The conveyor band 16 goes through a bath 18, which contains water and which permits the cooling of the objects. A suitable device in the bath, shown at 19, serves as a scraper blade to detach the coated objects from the band, if this becomes necessary.

The process of coating in accordance with this invention, is as follows: The objects are delievered one by one by conventional means, for instance a vibrating device, into the inclined oven 1 in which they are stopped by the stopping device 2 in the position shown in FIG. 2. At this stage, the grid 9 occupies the position shown in FIG. 2. The grid 9 then is lowered to the position shown in FIG. 1, which causes the stopping device 2 to tilt. The object, heated to a suitable temperature, is ejected through 3 and falls into that part of the fluidizing vessel 4 in which the powder is not fluidized, that is into the more dense zone. In this manner, the object falls gently and acquires a preliminary coating before coming in contact with the grid 9. Then the grid 9 is raised and causes the object to slide towards the fluidized part of the bath. In a subsequent stage, the object goes through the opening 12, reaches the track 14 and finally the conveying band 16. The coated object passes into the infrared oven 17 and is cooled in the vessel 18. The scraper 19 serves the function of detaching the articles from the band.

The advantages of the process and apparatus in accordance with this invention, are manifest. The apparatus may be used in connection with every type of powder conventionally employed in coating articles by the fluidized bed method. The apparatus may be used with thermosetting resins, such as silicone resins, or epoxy resins, or prepolymers from formaldehyde and phenols, thermoplastic materials such as polyvinyl chloride, copolymers of vinyl chloride and vinyl acetate, polystyrene, polyethylene, copolymers of ethylene and propylene, polyamides, linear polyesters or thermoplastic fluorinated resins.

The apparatus is particularly advantageous because it may be operated continuously with a high rate of production, it is easily assembled with common pieces of equipment and allows to coat small objects, in a manner superior to other appartuses known in the art. By the simple device of the inclined grid within the fluidizing vessel and the use of at least two zones of fluidized material of different density, the material slides along the inclined grid, without manual intervention. In accordance with the process and apparatus described herein, the use of tools and in general manual intervention, is limited to the first step of feeding the objects to be coated into the oven and to the final recovery of the coated pieces.

Although only one embodiment of the invention has been illustrated in detail in the drawings, those skilled in the art will readily appreciate that provision may be made in the vessel for obtaining three or more zones of different density of fluidization, and that other modifications of the process and apparatus may be made without departing from the spirit of the invention which is to be limited only by the scope of the appended claims.

What is claimed is:

1. A process for uniformly coating a small heated article by immersing it in a fluidized bed of plastic material which comprises the steps of:
    (a) heating the article to a predetermined temperature;
    (b) maintaining said fluidized bed of plastics material in at least two vertically adjacent zones, one being a relatively more dense zone and another being a relatively less dense zone;
    (c) lowering in said fluidized bed an inclined movable support having an upper end in the relatively more dense zone and a lower end in the relatively less dense zone;
    (d) letting the article drop under the influence of gravity into the relatively more dense zone, whereby at least the lower surface of the article becomes coated;

(e) letting the article slide along said support into the relatively less dense zone until it is uniformly and completely coated; and (f) raising said movable support to eject the coated article from the fluidized bed.

2. Apparatus for coating heated articles comprising, in combination:

(a) a vessel;

(b) an upper part and side walls to said vessel;

(c) means for supplying gas to said vessel, whereby at least a portion of the powder contained therein is fluidized and effective to form two substantially vertical adjacent powder containing zones within said vessel, one being a relatively more dense zone and the other a relatively less dense zone;

(d) means for supplying heated articles to be coated to the upper part of the vessel in the more dense zone;

(e) a movable grid which is inclined to the horizontal having an upper end in the relatively more dense zone and a lower end in the relatively less dense zone and which is vertically reciprocable within said vessel;

(f) means to reciprocate said grid vertically between an uppermost and a lowermost position, the higher part of the grid, in its lowermost position, being in a more dense zone, and the lower part of the grid in the less dense zone; and (g) means for removing articles to be coated from the less dense zone.

3. Apparatus according to claim 2, wherein the means for supplying gas to the vessel includes a base plate in the vessel having pores in said base plate and an adjustable shutter slidable over a portion of the base plate to cover the pores in such portion, the powder above said portion constituting the more dense zone.

4. Apparatus according to claim 2, wherein the means for supplying articles includes an electric furnace to heat the articles to be coated.

5. Apparatus according to and as claimed in claim 4, and further comprising a shutter associated with said furnace effective to release one or more articles into the vessel when desired.

6. Apparatus as claimed in claim 5, and including means operatively connecting said shutter to said grid, whereby articles are only released when the grid is in its lowermost position.

7. Apparatus according to claim 2, wherein the means to reciprocate the grid comprise a pneumatic jack.

8. Apparatus as claimed in claim 2, wherein the means for removing articles to be coated comprise means defining an aperture in one of said side walls, said aperture being positioned adjacent the lower part of the grid when the latter is in its uppermost position.

9. Apparatus as claimed in claim 8 and further comprising a perforated inclined slide positioned with its upper end adjacent said aperture and a recovery vessel beneath said slide, whereby articles passing through the aperture can fall down the slide and any excess powder thereon can fall through the perforations into said recovery vessel.

10. Apparatus according to claim 2, and further comprising an oven, a cooling station and a conveyor positioned to receive articles removed from the vessel and pass them into said oven and subsequently to said cooling station.

References Cited

UNITED STATES PATENTS

| | | | |
|---|---|---|---|
| 1,534,846 | 4/1925 | Fraser et al. | 117—F.B |
| 2,648,609 | 8/1953 | Wurster | 117—16X |
| 2,987,413 | 6/1961 | Dettling et al. | 117—21X |
| 3,112,220 | 11/1963 | Heiser et al. | 117—100 |
| 3,196,827 | 7/1965 | Wurster et al. | 118—24 |
| 3,253,944 | 5/1966 | Wurster | 117—100 |

WILLIAM D. MARTIN, Primary Examiner

E. J. CABIC, Assistant Examiner

U.S. Cl. X.R.

118—425